United States Patent
Fieglein (10) Patent No.: US 10,577,237 B2
(45) Date of Patent: Mar. 3, 2020

(54) METHODS AND DEVICES FOR FUEL DISPENSER ELECTRONIC COMMUNICATION

(71) Applicant: Wayne Fueling Systems LLC, Austin, TX (US)

(72) Inventor: Henry Fieglein, Cedar Park, TX (US)

(73) Assignee: Wayne Fueling Systems LLC, Austin, TX (US)

( * ) Notice: Subject to any disclaimer, the term of this patent is extended or adjusted under 35 U.S.C. 154(b) by 280 days.

(21) Appl. No.: 15/182,201

(22) Filed: Jun. 14, 2016

(65) Prior Publication Data

US 2017/0355588 A1    Dec. 14, 2017

(51) Int. Cl.
*G06Q 20/20* (2012.01)
*B67D 7/04* (2010.01)
*G06Q 20/32* (2012.01)
*G06Q 20/34* (2012.01)
*G07F 9/02* (2006.01)
*G07F 13/02* (2006.01)

(52) U.S. Cl.
CPC ............... *B67D 7/04* (2013.01); *G06Q 20/20* (2013.01); *G06Q 20/32* (2013.01); *G06Q 20/34* (2013.01); *G07F 9/023* (2013.01); *G07F 13/025* (2013.01)

(58) Field of Classification Search
CPC ........ G07F 15/001; G07F 15/00; G07F 9/023; G07F 11/002; B67D 7/04
See application file for complete search history.

(56) References Cited

U.S. PATENT DOCUMENTS

| | | | | |
|---|---|---|---|---|
| 8,032,414 B2 * | 10/2011 | Payne | ................... | G06Q 20/20 235/381 |
| 8,693,984 B1 * | 4/2014 | Webb | ................... | G06Q 20/18 455/406 |
| 9,972,159 B2 | 5/2018 | Carapelli et al. | | |
| 2007/0063029 A1 * | 3/2007 | Brandt | ................... | G06Q 10/08 235/385 |
| 2008/0189325 A1 | 8/2008 | Hanses et al. | | |
| 2011/0022223 A1 * | 1/2011 | Johnson, Jr. | ........... | G06Q 20/20 700/232 |
| 2013/0103585 A1 | 4/2013 | Carapelli | | |
| 2013/0246171 A1 * | 9/2013 | Carapelli | ........... | G06Q 20/3278 705/14.51 |
| 2014/0316588 A1 * | 10/2014 | Giera | ................... | F04B 49/065 700/282 |

(Continued)

OTHER PUBLICATIONS

International Search Report and Written Opinion for Application No. PCT/US2017/037386 dated Aug. 2, 2017.

*Primary Examiner* — Timothy R Waggoner
(74) *Attorney, Agent, or Firm* — Mintz Levin Cohn Ferris Glovsky and Popeo, P.C.

(57) ABSTRACT

Various exemplary methods and devices for fuel dispenser electronic communication are provided. In general, a fuel dispenser can be configured to electronically communicate with a network cloud to access cloud technology services. The communication can be direct, e.g., without the fuel dispenser communicating with the cloud network through an intermediary such as a fuel dispenser forecourt controller. The fuel dispenser can include a communication module configured to electronically communicate with the network cloud. The communication module can be on board the dispenser.

6 Claims, 7 Drawing Sheets

(56) References Cited

U.S. PATENT DOCUMENTS

| | | | |
|---|---|---|---|
| 2015/0106196 A1* | 4/2015 | Williams | G06Q 20/227 |
| | | | 705/14.51 |
| 2015/0120476 A1* | 4/2015 | Harrell | G06Q 20/202 |
| | | | 705/21 |
| 2016/0034899 A1* | 2/2016 | Myers | H04B 5/0081 |
| | | | 705/44 |

* cited by examiner

METHODS AND DEVICES FOR FUEL DISPENSER ELECTRONIC COMMUNICATION

FIELD

The present disclosure relates generally to methods and devices for fuel dispenser electronic communication.

BACKGROUND

The retail petroleum industry utilizes various types of fuel dispensers for dispensing fuel to customers. Some form of remote dispenser controller is traditionally used for controlling the actual dispensing of fuel by the fuel dispensers. The dispenser controller is often on the same premises as the fuel dispensers and coupled to a store interface unit so that a site attendant can monitor and control particular fueling dispensers from a building at the site (e.g., a gas station or other store). The dispenser controller sends data signals to the fuel dispensers providing various information and commands thereto. The information traditionally includes include price, preset amounts of fuel to dispense, and authorization to dispense fuel. The fuel dispensers likewise send data signals to the dispenser controller, traditionally including pump number, pump status, dispensed fuel volume, and sale value.

For fuel dispensers which allow local payment, some other form of Point of Sale (POS) system is traditionally used to control the payment functionality of the fuel dispenser. The POS system is often on the same site as the fuel dispensers and coupled to the store interface unit so that a site attendant can monitor and control particular fueling dispensers from a building at the site (e.g., a gas station or other store). The POS system sends data signals to the fuel dispensers providing various information and commands thereto. The information traditionally includes include user prompting controls, graphics, and media for display on the fuel dispenser's display screen. The fuel dispensers likewise send data signals to the POS system, traditionally including pump number, prompt status, transaction data, and sale value. Thus, traditionally, fuel dispensers must communicate with the POS system in order to complete a fuel purchase transaction, thereby requiring that secure data (e.g., payment details such as credit card information, customer PIN, etc.) be transmitted therebetween and accordingly be subject to fraudulent access and requiring that communication not be disabled or otherwise interrupted between the fuel dispensers and the dispenser controller for fuel purchase transactions to occur.

Some form of communication gateway is traditionally used to communicate with a remote source, such as a remote server or a network cloud, to receive updated information (e.g., updated price information, updated media, etc.) for transmission to the fuel dispensers via either the dispenser controller or the POS system. This communication model requires the fuel dispenser to communicate with the remote source with the communication gateway as an intermediary. The fuel dispenser is thus reliant on the dispenser controller, the POS system, and the communication gateway to receive updated information, which may cause service interruptions, site financial loss, and/or other inconveniences if the dispenser controller, the POS system, and the communication gateway loses network connectivity or becomes nonfunctional due to, e.g., power loss, component failure, incompatible software upgrade, etc.

Accordingly, there remains a need for improved methods and devices for fuel dispenser electronic communication.

SUMMARY

In general, methods and devices for fuel dispenser electronic communication are provided.

In one aspect, a fuel dispenser is provided that in one embodiment includes a first compartment having therein a pump for dispensing the fuel, and a second compartment having therein electronics for facilitating payment for the fuel and for facilitating the dispensing of the fuel. The electronics include a controller configured to control the pump to regulate the dispensing of the fuel, a communication link, a payment system, and a cloud communication module configured to facilitate wireless electronic communication between the fuel dispenser and a network cloud. The cloud communication module is configured to transmit metric data to the network cloud. The metric data includes at least one of data received by the cloud communication module from the payment system via the communication link and data received by the cloud communication module from the controller via the communication link.

The fuel dispenser can have any number of variations. For example, the metric data can include fuel usage data from the controller that is indicative of an amount of fuel that has been dispensed from the fuel dispenser, and payment data from the payment system that is indicative of a total amount of payment for fuel that has been dispensed from the fuel dispenser. For another example, the metric data can include status data from the controller that is indicative of a status of the fuel dispenser. For yet another example, the metric data can include status data from the controller that is indicative of a status of the fuel dispenser, fuel usage data from the controller that is indicative of an amount of fuel that has been dispensed from the fuel dispenser, and payment data from the payment system that is indicative of a total amount of payment for fuel that has been dispensed from the fuel dispenser. For another example, the fuel dispenser can include a radio frequency identification (RFID) scanner configured to scan an RFID tag associated with a component disposed in one of the first compartment and the second compartment, and the metric data can include data indicative of information scanned by the RFID scanner.

For another example, the controller can be configured to provide instructions to the pump to regulate the dispensing of the fuel, and the instructions can be based on data received by the payment system. The payment system can include a mobile payment terminal or can include a card reader attached to the fuel dispenser.

For yet another example, the fuel dispenser can include a display screen configured to display media thereon, the media being displayed having been received by the cloud communication module from the network cloud. For still another example, the communication link can include first and second communication links each configured to facilitate electronic communication between the cloud communication module and the payment system and between the cloud communication module and the controller. For another example, the communication link can be wired.

In another embodiment, a fuel dispenser includes a wired communication link on board the fuel dispenser and configured to facilitate electronic communication between the fuel dispenser and a payment system, a wireless communication link on board the fuel dispenser and configured to facilitate wireless electronic communication between the fuel dispenser and a network cloud, and a processor on board the fuel dispenser and configured to cause fuel to be dispensed from the fuel dispenser in response to data received via the wired communication link indicative of a payment attempt for fuel and to data received via the wireless communication link indicative of authorization of the payment attempt.

The fuel dispenser can have any number of variations. For example, the wireless communication link can be configured to transmit metric data to the network cloud, and the metric data can include data received via the wired communication link. The metric data can include at least one of status data that is indicative of a status of the fuel dispenser, fuel usage data that is indicative of an amount of fuel that has been dispensed from the fuel dispenser, scanned data that is indicative of information an RFID scanner on board the fuel dispenser scans from one or more RFID tags attached to one or more components disposed in the fuel dispenser, and payment data that is indicative of a total amount of payment for fuel that has been dispensed from the fuel dispenser.

For another example, the wired communication link can be configured to facilitate electronic communication between the fuel dispenser and a controller configured to regulate dispensing of fuel from the fuel dispenser, and the processor can be configured to cause the fuel to be dispensed from the fuel dispenser by causing instructions to be transmitted to the controller via the wired communication link.

For yet another example, the fuel dispenser can include a display screen configured to display media thereon, the media being displayed having been received from the network cloud.

In another aspect a method of using a fuel dispenser is provided that in one embodiment includes receiving at a fuel dispenser via a wired communication link data indicative of a payment attempt for fuel to be dispensed from the fuel dispenser, transmitting the data indicative of the payment attempt to a network cloud via a wireless communication link on board the fuel dispenser, receiving at the fuel dispenser from the network cloud via the wireless communication link data indicative of the payment attempt having been authorized, and causing the fuel to be dispensed from the fuel dispenser in response to the receipt of the data indicative of the payment attempt having been authorized.

The method of using the fuel dispenser can have any number of variations. For example, the method can include transmitting metric data from the fuel dispenser to the network cloud via the wireless communication link, and the metric data can include at least one of status data that is indicative of a status of the fuel dispenser, fuel usage data that is indicative of an amount of fuel that has been dispensed from the fuel dispenser, scanned data that is indicative of information an RFID scanner on board the fuel dispenser scans from one or more RFID tags attached to one or more components disposed in the fuel dispenser, and payment data that is indicative of a total amount of payment for fuel that has been dispensed from the fuel dispenser. For another example, the method can include receiving media data at the fuel dispenser from the network cloud via the wireless communication link, and displaying media on a display screen of the fuel dispenser in accordance with the received media data.

Non-transitory computer program products (e.g., physically embodied computer program products) are provided that store instructions, which when executed by one or more data processors of one or more computing systems, causes at least one data processor to perform operations herein. Similarly, computer systems are also provided that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

BRIEF DESCRIPTION OF DRAWINGS

This invention will be more fully understood from the following detailed description taken in conjunction with the accompanying drawings, in which.

DETAILED DESCRIPTION

Certain exemplary embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention.

Further, in the present disclosure, like-named components of the embodiments generally have similar features, and thus within a particular embodiment each feature of each like-named component is not necessarily fully elaborated upon. Additionally, to the extent that linear or circular dimensions are used in the description of the disclosed systems, devices, and methods, such dimensions are not intended to limit the types of shapes that can be used in conjunction with such systems, devices, and methods. A person skilled in the art will recognize that an equivalent to such linear and circular dimensions can easily be determined for any geometric shape.

Various exemplary methods and devices for fuel dispenser electronic communication are provided. In general, a fuel dispenser can be configured to electronically communicate with a network cloud to access cloud technology services. The communication can be direct, e.g., without the fuel dispenser communicating with the cloud network through an intermediary such as a fuel dispenser forecourt controller. The fuel dispenser being configured to directly communicate with the network cloud may allow the fuel dispenser to access the cloud technology services even when there is no fuel dispenser forecourt controller present or when a fuel dispenser forecourt controller is present but loses network connectivity or becomes nonfunctional due to, e.g., power loss, component failure, incompatible software upgrade, etc. The fuel dispenser being configured to directly communicate with the network cloud may allow the fuel dispenser to communicate with the cloud entirely wirelessly, which may help reduce maintenance costs and/or help reduce the likelihood of communication failure, since fuel dispensers traditionally communicate with the dispenser controller via wired connection involving two wires that typically need regular monitoring and maintenance and that run outside of the fuel dispenser and hence are more likely to be damaged and/or tampered with than components secured within the fuel dispenser. Additionally, upgrading a fuel dispenser that has a two-wire connection to have more than two wires for communication purposes is very costly and is disruptive to a fueling site. Upgrading the fuel dispenser to be configured to electronically communicate with a network cloud to access cloud technology services would be less expensive and hence a more attractive option than upgrading existing fuel dispensers and than buying entirely new fuel dispensers.

The fuel dispenser being configured to directly communicate with the network cloud may allow the fuel dispenser to manage its own monitoring, payments, and media. The cloud technology services that the fuel dispenser can be configured to directly access can include any one or more of monitoring and analytics services that enable site owners to understand the status of the fuel dispenser(s) at their fueling site (e.g., gas station or other store), fuel management services that allow comparison of fuel usage metrics with fuel tank metrics, mobile payment services that allow for the processing of payment transactions for fuel and/or other goods or services provided at a fuel dispensing site (e.g., car washes, in-store items such as food and drinks, etc.) involving a customer mobile terminal such as a mobile phone, payment terminal services that allow for the processing of payment transactions for fuel and/or other goods or services provided at a fuel dispensing site involving a card reader or other payment terminal at the fuel dispenser, and media services that allow visual and/or audible media (e.g., advertisements, entertainment, maps, etc.) to be provided by the fuel dispenser.

The fuel dispenser can include a communication module configured to electronically communicate with the network cloud. The communication module can be on board the dispenser, such as by being disposed in a housing thereof or otherwise attached to the housing thereof, which may allow the fuel dispenser to manage its own communications. Thus, in the event that any one of a plurality of fuel dispensers at a fueling site experiences a failure that prevents cloud communication (e.g., power loss, component failure, fraud detection resulting in a lock-out of the fuel dispenser, etc.), the other, non-failed fuel dispensers may continue to electronically communicate normally with the cloud. In contrast, in traditional systems in which the plurality of fuel dispensers communicate with the cloud indirectly through a dispenser controller, if the controller experiences a failure that prevents cloud communication, all of the dispensers lose communication and the site accordingly risks problems such as financial loss and reduced customer confidence. The communication module being on board the fuel dispenser may allow existing fuel dispensers to be retrofitted with the communication module so as to gain an ability to electronically communicate directly with the network cloud to access cloud technology services.

Figure 1:
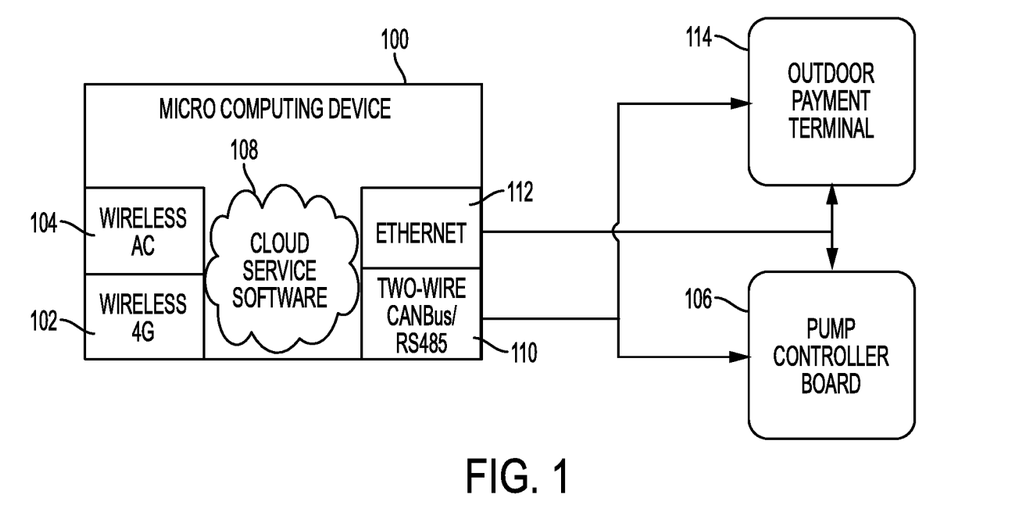
FIG. 1 is a schematic view of one embodiment of electronic components of a fuel dispenser.

FIG. 1 illustrates one embodiment of a communication module 100 configured to electronically communicate with a network cloud to access cloud technology services. The communication module (also referred to herein as a "micro computing device") 100 is configured to be installed on board a fuel dispenser, as discussed herein. The communication module 100 includes one or more wireless communication links 102, 104 configured to facilitate wireless communication between the fuel dispenser and a network cloud, cloud service software 108 executable by a processor on board the fuel dispenser and configured to facilitate execution at the fuel dispenser of cloud controlled applications, one or more wired communication links 110, 112 configured to facilitate wired communication between the communication module 100 and an outdoor payment terminal 114 of the fuel dispenser and a pump controller board 106 of the fuel dispenser. The payment terminal 114 and the pump controller board 106 are also configured to communicate with one another, such as via wired communication link(s) within the fuel dispenser.

The outdoor payment terminal 114 can have any of a variety of configurations. In general, the outdoor payment terminal 114 includes a payment mechanism accessible to a customer outside the fuel dispenser to facilitate the customer's payment for fuel and/or other goods or services available at the site of the fuel dispenser. Examples of the outdoor payment terminal 114 include a card reader configured to interface with a customer's card (e.g., credit card, debit card, etc.) and a mobile payment gateway configured to interface with a customer's mobile terminal such as a mobile phone. The outdoor payment terminal 114 can, in at least some embodiments, include both a card reader and a mobile payment gateway. In other embodiments, the outdoor payment terminal 114 can include only one of a card reader and a mobile payment gateway. The outdoor payment terminal 114 including only a mobile payment gateway may allow for avoidance of any change in card reader standards, such as a change to the EMV technical standard, which may be a very costly change and/or may become outdated quickly as technology and consumer preferences change.

The pump controller board 106 can have any of a variety of configurations. In general, the pump controller board 106 is configured to control operation of a pump of the fuel dispenser that pumps fuel from a fuel reservoir and out of the fuel dispenser. The pump controller board 106 includes any number of components configured to facilitate data processing, such as a memory storing instructions and a processor configured to execute the stored instructions.

The one or more wireless communication links 102, 104 are, as mentioned above, configured to facilitate wireless communication between the fuel dispenser and the network cloud. The wireless communication can be according to any of a variety of communication protocols, e.g., TCP/IP, etc., as will be appreciated by a person skilled in the art. The wireless cellular connectivity 102 is configured to provide wireless mobile communication, such as cellular connectivity. The wireless cellular connectivity 102 is 4G connectivity but other types of mobile communication standards may be used instead or in addition. Any of a variety of types of wireless cellular connectivity hardware can be used for the wireless cellular connectivity 102, as will be appreciated by a person skilled in the art. The wireless AC connectivity 104 is configured to provide wireless communication in accordance with the IEEE 802.11ac wireless networking standard. Connectivity according to another wireless networking standard is possible and may be included alternatively or in addition. The wireless AC connectivity 104 may facilitate wireless mesh network communication, as will be appreciated by a person skilled in the art. Any of a variety of types of wireless AC connectivity hardware can be used for the wireless AC connectivity 104, as will be appreciated by a person skilled in the art. The communication module 100 includes each of wireless cellular connectivity 102 and wireless AC connectivity 104 in this illustrated embodiment, but a communication module can include only one of these types of wireless connectivity. For example, the types of wireless connectivity that the communication module 100 includes can be chosen by an owner of the fuel dispenser according to the owner's current fueling site setup and/or future fueling site plans, and the communication module 100 may be manufactured accordingly.

The one or more wired communication links 110, 112 are, as mentioned above, configured to facilitate wired communication between the communication module 100 and the outdoor payment terminal 114 and between the communication module 100 and the pump controller board 106. The wired communication can be according to any of a variety of communication protocols, e.g., TCP/IP, etc., as will be appreciated by a person skilled in the art. The two-wire connectivity 110 is configured to provide wired communication via two wires, such as via a controller area network bus (CAN Bus) two wire connection, an RS485 two wire connection, a current loop connection, or other type of two wire connection. The cable connectivity 112 is configured to provide wired communication via cable connection, such as an Ethernet cable or other network cable. The communication module 100 includes each of two-wire connectivity 110 and cable connectivity 112 in this illustrated embodiment, but a communication module can include only one of these types of wired connectivity. For example, older fuel dispensers typically have two-wire connectivity capabilities while newer fuel dispensers typically have Ethernet connectivity capabilities instead. Thus, a communication module to be retrofit to an older fuel dispenser may be manufactured to include wired connectivity only with the two-wire connectivity 110, while a communication module to be retrofit to an older fuel dispenser may be manufactured to include wired connectivity only with the cable connectivity 112.

The communication module 100 includes all of one or more wireless communication links 102, 104 and one or more wired communication links 110, 112 in this illustrated embodiment, but in other embodiments, the communication module 100 can include only wireless communication link(s) 102, 104 or can include only wired communication link(s) 110, 112.

The communication module 100 can include one or more antennas to facilitate communication via its communication links.

Figure 2:
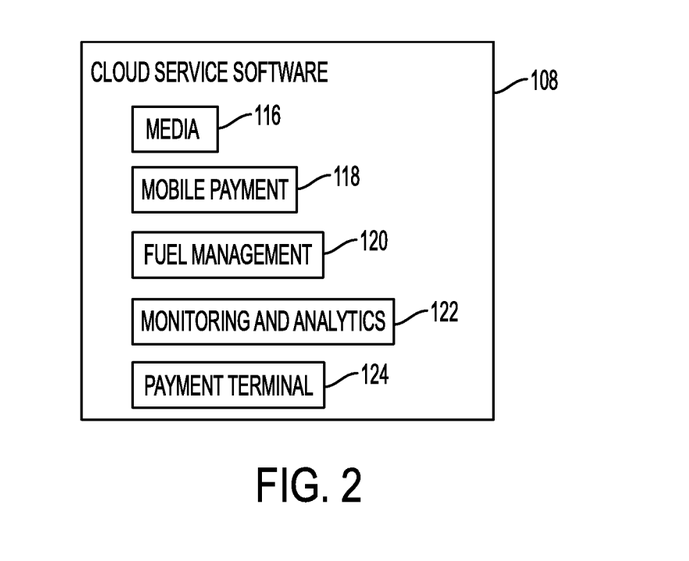
FIG. 2 is a schematic view of one embodiment of cloud service software of the electronic components of FIG. 1.

The cloud service software 108 is, as mentioned above, configured to facilitate execution at the fuel dispenser of cloud controlled applications. As shown in FIG. 2, the cloud service software 108 includes a plurality of modules 116, 118, 120, 122, 124. A person skilled in the art will appreciate that any of the modules can be subdivided or can be combined with other modules.

The media module 116 is configured to access from the network cloud media services that allow visual and/or audible media to be provided by the fuel dispenser. The media module 116 is thus configured to facilitate the fuel dispenser's provision of media on a display of the fuel dispenser and/or through a speaker of the fuel dispenser. The media module 116 is configured to receive the media from the network cloud (e.g., from a server in the cloud, etc.) and to store the media in a media library at the fuel dispenser, which may be stored in a memory of the fuel dispenser. The media can be transmitted from the network cloud to the fuel dispenser according to any of a variety of schedules, as will be appreciated by a person skilled in the art, and as chosen for the fuel dispenser in any of a variety of ways, as will also be appreciated by a person skilled in the art. Traditionally, if a fuel dispenser has indirect connectivity to the network cloud, media for the fuel dispenser is received by an in-store point of sale (POS) terminal and then provided to the fuel dispenser. The media module 116 allows the fuel dispenser to be in control of its own media, which may allow more targeted media to be provided to the fuel dispenser (e.g., media more geographically relevant to customers of the fuel dispenser, media more specific to the particular fueling site that includes the fuel dispenser, etc.) and/or updated media to be provided more frequently to the fuel dispenser since an intermediary such as the POS terminal need not be involved.

In at least some embodiments, the fuel dispenser can be configured to function in standalone mode with the media module 116 controlling provision of media (e.g., on a display of the fuel dispenser, etc.) without instruction from the network cloud. The provided media can be just for the fuel dispenser or can be provided in sync with media provided on the other fuel dispenser at the same site as the fuel dispensers.

The mobile payment module 118 is configured to access from the network cloud mobile payment services that allow for the processing of mobile payment transactions for fuel and/or other goods or services provided at the fuel dispensing site that includes the fuel dispenser. The mobile payment module 118 allows the fuel dispenser to act as its own server for mobile payment transactions that communicates with the network cloud to receive verification (or refusal) of a customer's mobile payment information. The fuel dispenser thus need not communicate with a dispenser controller or with an in-store POS terminal in order to authorize a mobile payment that allows the customer to access the requested good(s)/service(s), e.g., for the customer to begin fueling, for the customer to drive through the car wash, etc. Instead, the fuel dispenser may directly communicate with the network cloud to verify the mobile payment. The mobile payment module 118 may thus speed up mobile payment transactions and/or allow secure data to be transmitted between fewer points (e.g., between the fuel dispenser and the network cloud without a dispenser controller and/or an in-store POS terminal as intermediary points) and thus be less likely to be fraudulently accessed. The mobile payment module 118 can be configured to receive authorization for mobile payments from the network cloud in any of a variety of ways, as will be appreciated by a person skilled in the art.

The fuel management module 120 is configured to access from the network cloud fuel management services that allow comparison of fuel usage metrics with fuel tank metrics. The fuel management module 120 allows the fuel dispenser to gather fuel usage metrics for fuel dispensed therefrom, to gather totalized fuel purchase transactions, and to transmit the gathered fuel usage metrics and the gathered totalized fuel purchase transactions to the network cloud. The fuel management module 120 can be configured to control the gathering of fuel usage metrics in any of a variety of ways, as will be appreciated by a person skilled in the art. For example, the fuel management module 120 can be configured to electronically communicate with a fuel meter of the fuel dispenser, receive fuel dispensing information therefrom, and cause the received fuel dispensing information to the stored in a memory of the fuel dispenser for subsequent transmission to the network cloud. The fuel management module 120 can be configured to control the gathering of totalized fuel purchase transactions in any of a variety of ways, as will be appreciated by a person skilled in the art. For example, the fuel management module 120 can be configured to access a memory of the fuel dispenser having stored therein fuel payment information as provided thereto by the mobile payment module 118 and/or the payment terminal module 124. The network cloud can be configured to, as will be appreciated by a person skilled in the art, compare the received fuel usage metrics and totalized fuel purchase transactions with tank gauge metrics (e.g., data from an automated regulator, etc.) to help determine any inefficiencies in fuel management, which may help identify needed fuel dispenser service and/or help identify if fuel is being lost anywhere between the fuel reservoir and its eventual dispensing from the fuel dispenser.

The monitoring and analytics module 122 is configured to access from the network cloud monitoring and analytics services that enable site owners to understand the status of the fuel dispenser. The monitoring and analytics module 122 allows the fuel dispenser to monitor one or more metrics related thereto and transmit monitored information to the network cloud for analysis. One example of a network cloud monitoring and analytics service that can analyze such data is the Wayne iSense™ remote monitoring system. Examples of the metrics include a temperature of dispensed fuel, emissions from the fuel dispenser's pump, number of payment transactions per unit time, and amount of fuel pumped in a time period. The monitoring and analytics module 122 can allow the fuel dispenser to store time/date stamped records of events and alarm conditions that occur at the fuel dispenser, such as network connectivity losses, any identified possible security breaches, etc., and to transmit the stored events and alarms to the network cloud for, e.g., recordkeeping and/or management follow-up.

The payment terminal module 124 is configured to access from the network cloud outdoor payment services that allow for the processing of outdoor payment transactions for fuel and/or other goods or services provided at a fuel dispensing site involving a card reader or other payment terminal at the fuel dispenser. The payment terminal module 124 allows the fuel dispenser to act as its own server for payment transactions made via the payment terminal that communicates with the network cloud to receive verification (or refusal) of a customer's payment information. The fuel dispenser thus need not communicate with a dispenser controller or with an in-store POS terminal in order to authorize the payment that allows the customer to access the requested good(s)/service (s), e.g., for the customer to begin fueling, for the customer to drive through the car wash, etc. Instead, the fuel dispenser may directly communicate with the network cloud to verify the payment made via the payment terminal. The payment terminal module 124 may thus speed up payment transactions made using the payment terminal and/or allow secure data to be transmitted between fewer points (e.g., between the fuel dispenser and the network cloud without a dispenser controller and/or an in-store POS terminal as intermediary points) and thus be less likely to be fraudulently accessed. The payment terminal module 124 can be configured to receive authorization for payments from the network cloud in any of a variety of ways, as will be appreciated by a person skilled in the art. The payment terminal module 124 can be configured to switch between secure and unsecure prompting for customer information to be input to the fuel dispenser, e.g., via a keypad of the fuel dispenser, via a touchscreen of the fuel dispenser, etc. without needing instruction for such from a dispenser controller and/or an in-store POS terminal.

Some vehicles are able to emit a wireless signal indicating information related to fueling of the vehicle. The communication module 100 (e.g., the mobile payment module 118 and/or the payment terminal module 124) is configured to communicate wirelessly with a vehicle in effective communication range therewith. The communication module 100 is configured to receive a wireless signal being emitted from the vehicle and thereby receive information from the vehicle related to a user's fuel transaction, such as an amount of fuel needed to fill the vehicle's tank, payment information for a customer associated with the vehicle, and service information for the vehicle. The received information may be presented to the user (e.g., via a display of the fuel dispenser) to facilitate completion of the fuel transaction, such as presenting received payment information to the user that the user can verify as the correct payment details for the transaction.

The communication module 100 includes all of the modules 116, 118, 120, 122, 124 in this illustrated embodiment. In other embodiments, the communication module 100 can include only a subset of the modules 116, 118, 120, 122, 124, e.g., include one, two, three, or four of the modules 116, 118, 120, 122, 124 instead of all five. For example, the communication module 100 can include any one or more of the modules 118, 120, 122, 124 if the fuel dispenser does not have a display screen on which media can be shown so as to render the media module 116 unnecessary. However, in anticipation of fuel dispenser upgrades, the communication module 100 may include the media module 116 even if the fuel dispenser currently lacks a display screen. For another example, the communication module 100 can include the mobile payment module 118 and, optionally, any one or more of the modules 116, 120, 122 if the fuel dispenser is configured only for mobile payments so as to render the payment terminal module 124 unnecessary. For yet another example, the communication module 100 can include the payment terminal module 124 and, optionally, any one or more of the modules 116, 120, 122 if the fuel dispenser is configured only for payment terminal so as to render the mobile payment module 118 unnecessary. However, in anticipation of fuel dispenser upgrades, the communication module 100 may include the mobile payment module 118 even if the fuel dispenser is currently configured to only accept payments via a payment terminal.

The fuel dispenser includes at least one processor configured to execute the cloud service software 108. For example, the fuel dispenser can include a computing system, such as the Raspberry Pi, the Arduino Uno, or the CHIP computer, that includes a processor and a memory storing the cloud service software 108 executable by the processor.

The communication module 100 can be a box configured to be attached to a fuel dispenser as part of the fuel dispenser's manufacturing process such that the communication module 100 is an original part thereof or can be a box configured to be attached to a fuel dispenser as part of a retrofitting process to an existing fuel controller. The box includes a housing having at least partially therein the one or more wireless communication links 102, 104, the cloud service software 108, and the one or more wired communication links 110, 112. The communication module's one or more antennas can be at least partially located outside the box to facilitate the antenna's network accessibility. The box can include one or more communication links specifically selected for a fuel dispenser so as to provide customized communication capability to the fuel dispenser, new or existing, to which the box is attached. For example, the communication module 100 can include only wired communication link(s) for owners with fueling sites already configured to wired connectivity. For another example, the communication module 100 can include both wireless communication link(s) and wired communication link(s) to provide versatility. Similarly, the box can include cloud communication capabilities specifically selected for a fuel dispenser (new or existing) since the modules that the cloud service software 108 includes can be different for different communication modules 100. For example, one communication module 100 can include the modules 118, 120, 122, 124 but not the media module 116 if the fuel dispenser does not have a display screen on which media can be shown.

The box can have a variety of sizes. In an exemplary embodiment, the box can have a dimension of 3 in. by 2 in. by 1 in., which may facilitate disposal of the box within many existing fuel dispensers and fitting into existing designs of fuel dispensers.

In an exemplary embodiment, the box is compliant with the relevant Underwriters Laboratory (UL) standards to provide safety and user confidence when the box is the combustible environment of a fueling site.

Figure 3:
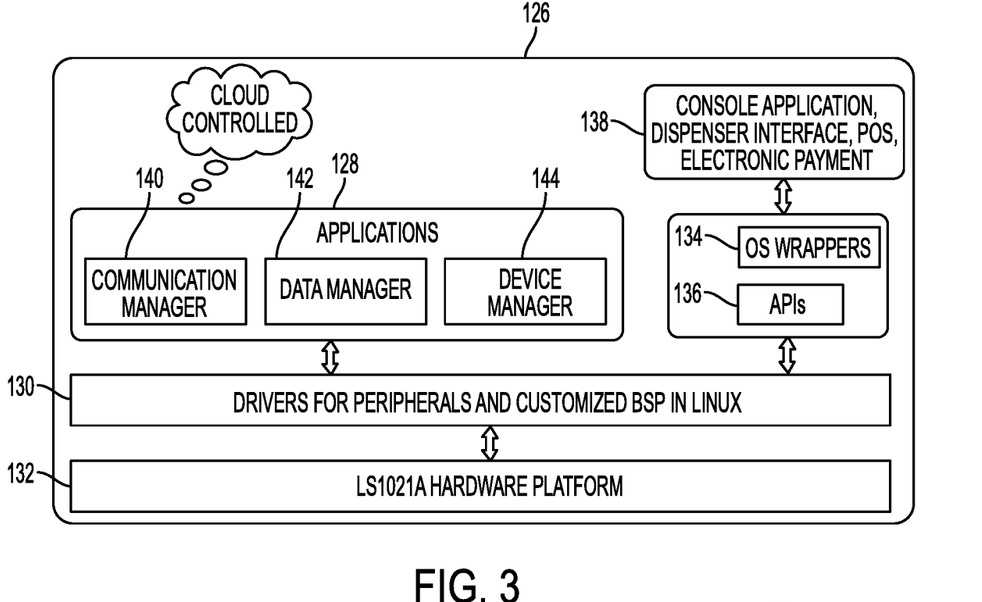
FIG. 3 is a schematic view of one embodiment of an architecture for a communication module of a fuel dispenser.

FIG. 3 illustrates one embodiment of an architecture 126 for a communication module such as the communication module 100 of FIG. 1 or any of the other communication modules described herein. In general, the architecture 126 is configured to implement the communication module's cloud service software. The architecture 126 includes one or more applications 128, one or more drivers for peripherals and a board support package (BSP) 130, a processor 132, operating system (OS) wrappers 134, application programming interfaces (APIs) 136, and functional applications 138. The one or more applications 128 are controlled by the network cloud with which the communication module that includes the architecture 126 is configured to wirelessly communicate. The one or more applications 128 include a communication manager 140 configured to facilitate communication between the network cloud and the fuel dispenser that includes the communication module, a data manager 142 for managing gathered data and stored data, and a device manager 144 configured to facilitate control of hardware of the fuel dispenser. The one or more applications 128 are configured to communicate with the drivers and BSP 130. The BSP can be implemented in Linux, as in this illustrated embodiment, or other OS. The drivers and BSP 130 are configured to communicate with the processor 132, which is an LS1021A hardware platform in this illustrated embodiment, although other processors may be used. The drivers and BSP 130 are also configured to communicate with the OS wrappers 134 and the APIs 136. The OS wrappers 134 and the APIs 136 are configured to communicate with the functional applications 138. The functional applications 138 generally relate to functions of the fuel dispenser, including a console application, a dispenser interface, a POS, and electronic payment.

Figure 4:
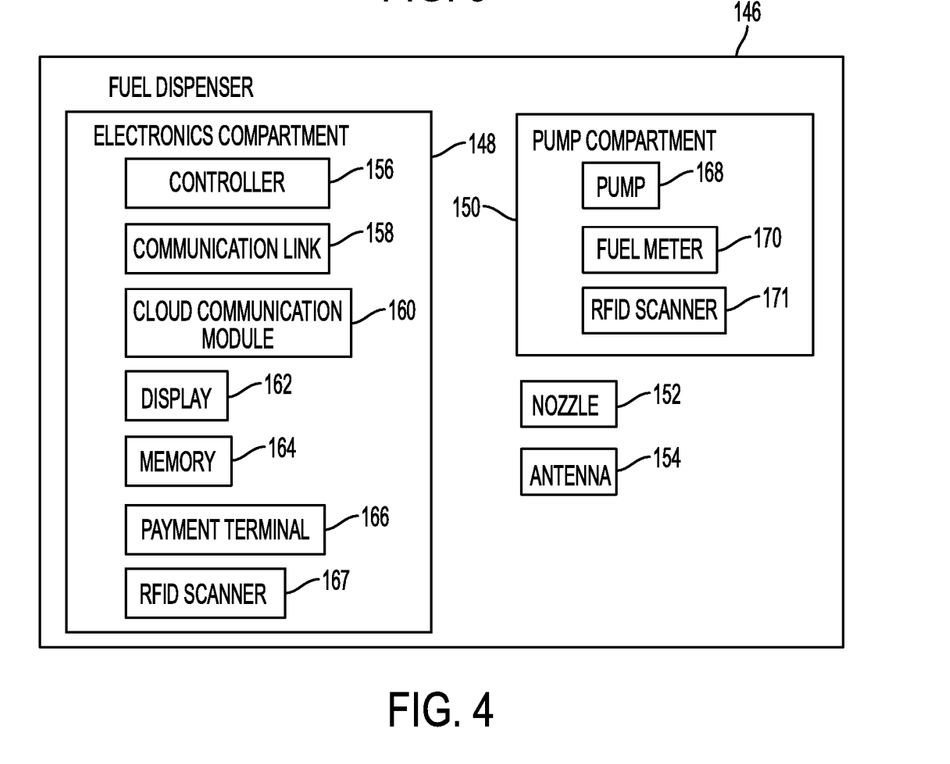
FIG. 4 is a schematic view of one embodiment of a fuel dispenser.

FIG. 4 illustrates one embodiment of a fuel dispenser 146 configured to electronically communicate with a network cloud to access cloud technology services. The fuel dispenser 146 includes an electronics compartment 148, a pump compartment 150, a nozzle 152, and an antenna 154.

The electronics compartment 148 has therein electronics therein for facilitating payment for the fuel and for facilitating the dispensing of the fuel. The electronics include a controller 156, a communication link 158 configured to provide wired and/or wireless communication, a communication module 160 configured to electronically communicate with a network cloud to access cloud technology services, a display 162 configured to show information thereon, a memory 164 configured to store data therein, and a payment terminal 166 configured to facilitate customer payment. As mentioned above, the fuel dispenser 146 can be configured for mobile payment instead of in addition to payment through the payment terminal 166 and hence need not include the payment terminal 166. As also mentioned above, the communication link 158 can be part of the communication module 160.

The pump compartment 150 includes a pump 168 configured to pump fuel from a fuel tank or other reservoir and includes a fuel meter 170 configured to monitor fuel flow. The pump compartment 150 can include other elements to facilitate fuel dispensing, such as valves, a vapor recovery system, etc., as will be appreciated by a person skilled in the art. The pump compartment 150 is isolated from the electronics compartment 148 within the fuel dispenser 146 to facilitate safety, security, and/or maintenance, as will be appreciated by a person skilled in the art. Fuel is thus not allowed to flow from the pump compartment 150 to the electronics compartment 148 and instead flows from the pump compartment 150 to the nozzle 152 for dispensing. The nozzle 152 includes one or more nozzles each configured to dispense fuel from the fuel dispenser as pumped therefrom by the pump 168.

The antenna 154 is configured to facilitate communication through the communication link 158. As mentioned above, the antenna 154 can be part of the communication module 160.

Figure 5:
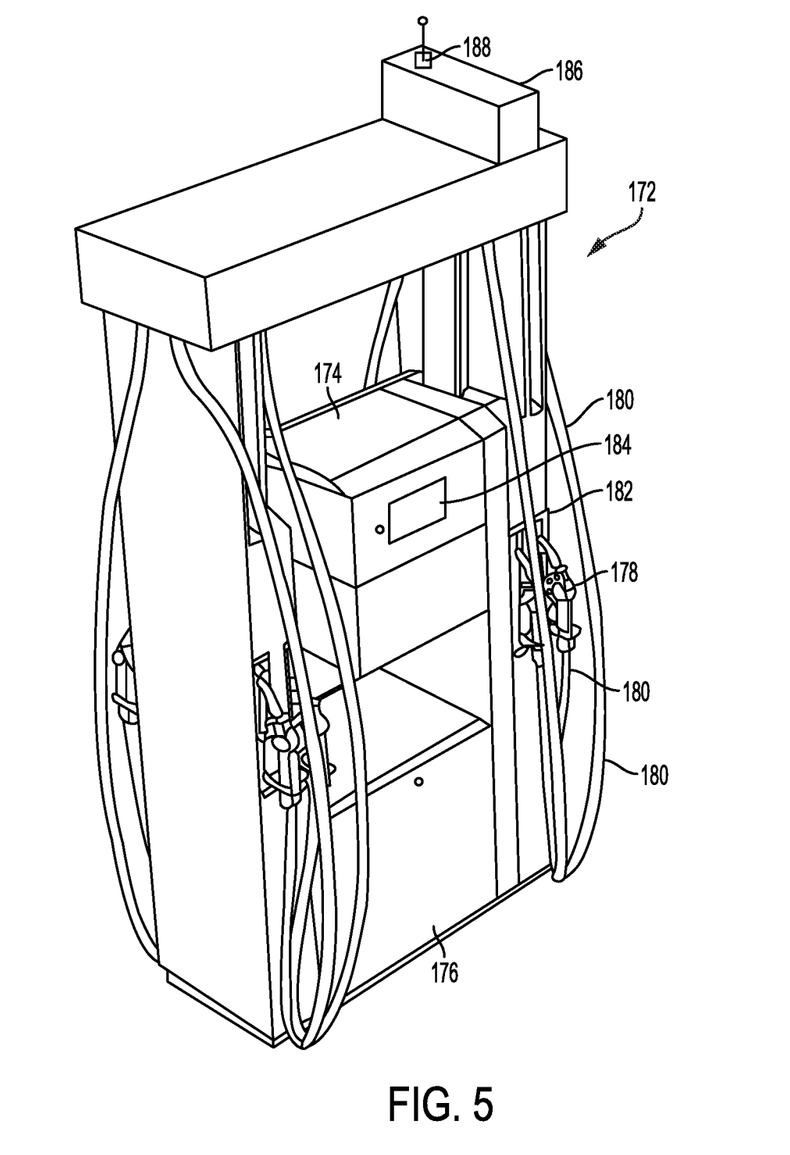
FIG. 5 is a perspective view of another embodiment of a fuel dispenser.

FIG. 5 illustrates another embodiment of a fuel dispenser 172 configured to electronically communicate with a network cloud to access cloud technology services. The fuel dispenser 172 includes an electronics compartment 174 and a pump compartment 176. The electronics compartment 174 has electronics at least partially disposed therein, as discussed herein. The electronics are obscured in FIG. 5 except for a display 184 on the electronics compartment 174. A second display is on the other side of the electronics compartment 174 but is obscured in FIG. 5. The pump compartment 176 has elements to facilitate fuel dispensing at least partially disposed therein, as discussed herein.

The fuel dispenser 172 is configured to be connected to an underground reservoir containing fuel. When filling up the tank of a motor vehicle, the fuel is pumped from the underground reservoir by a pump located in the pump compartment 176 and to a nozzle 178 via a fuel pipe (not shown) and a fuel hose 180. When the fuel hose 180 is not in use, the fuel hose 180 hangs along the fuel dispenser 172, and the nozzle 178 is inserted in a nozzle boot 182. The fuel dispenser 172 includes four hoses and four nozzles on one side of the dispenser and four hoses and four nozzles on the other side of the dispenser, but as will be appreciated by a person skilled in the art, the fuel dispenser 172 can include another number of hoses and nozzles. A person skilled in the art will also appreciate that the fuel dispenser 172 can have various other configurations.

The fuel dispenser 172 includes a communication module 186 that is in communication with electronics in the electronics compartment 174. The communication module 186 is mounted on a top housing of the fuel dispenser 172 but as mentioned above, the communication module 186 can instead be within the electronics compartment 174. The communication module 186 being attached to the top housing may facilitate retrofitting of the communication module 186 to an existing fuel dispenser and/or facilitate repair, upgrade, or other maintenance of the communication module 186. The fuel dispenser 172 also includes an antenna 188, which is attached to the communication module 186.

Figure 6:
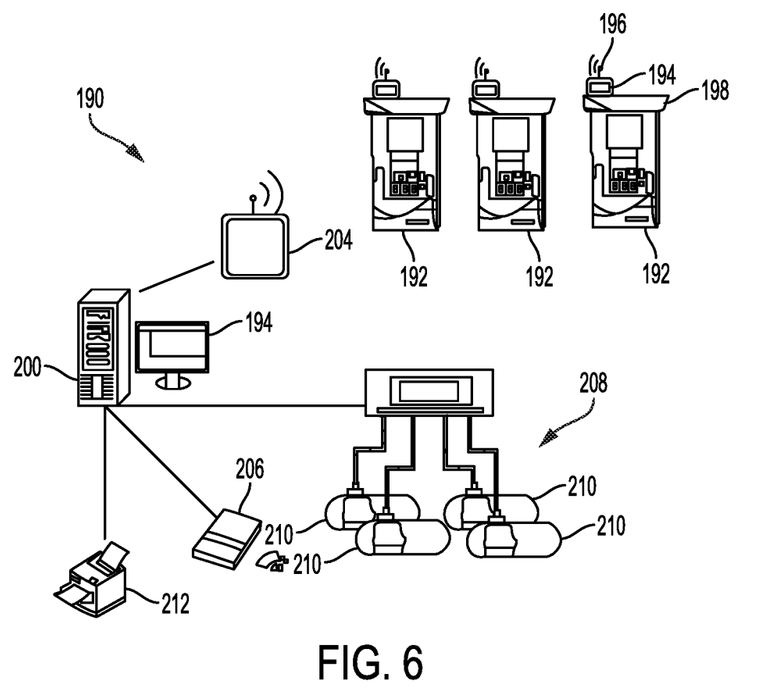
FIG. 6 is a schematic view of one embodiment of a fuel dispensing system.

FIG. 6 illustrates one embodiment of a fuel dispensing system 190 for a fueling site that includes a plurality of fuel dispensers 192 that each include a communication module 194 with an antenna 196. The communication modules 194 are mounted to top housings 198 of the fuel dispensers 192 similar to the communication modules 186 of FIG. 5. The system 190 includes three fuel dispenser 192 but can include any number of fuel dispensers. In the event that the system 190 includes more than one fuel dispenser, the fuel dispensers can each be the same as one another, or any one of the fuel dispensers can vary from any one or more of the other fuel dispensers. The fuel dispensers 192 in this illustrated embodiment are the same as one another.

The fuel dispensers 192 are in a forecourt of the fueling site. The system 190 also includes a monitoring area, typically in a store, sales room, or other station area at the fueling site or at a remote location (e.g., a corporate office, etc.), that allows a user to monitor the fueling site. The monitoring area includes a computer including a server 200 and display 202, a wireless access point (AP) 204 electronically coupled to the computer and configured to communicate with the communication modules 194, a printer 212 electronically coupled to the computer, an attendant identity card reader 206 electronically coupled to the computer, and a fuel tank indication system 208 electronically coupled to the computer configured to monitor fuel tanks 210 that provide fuel to the dispensers 192. The fuel tanks 210 can be in the forecourt (e.g., underground in the forecourt) rather than the monitoring area.

Figure 7:
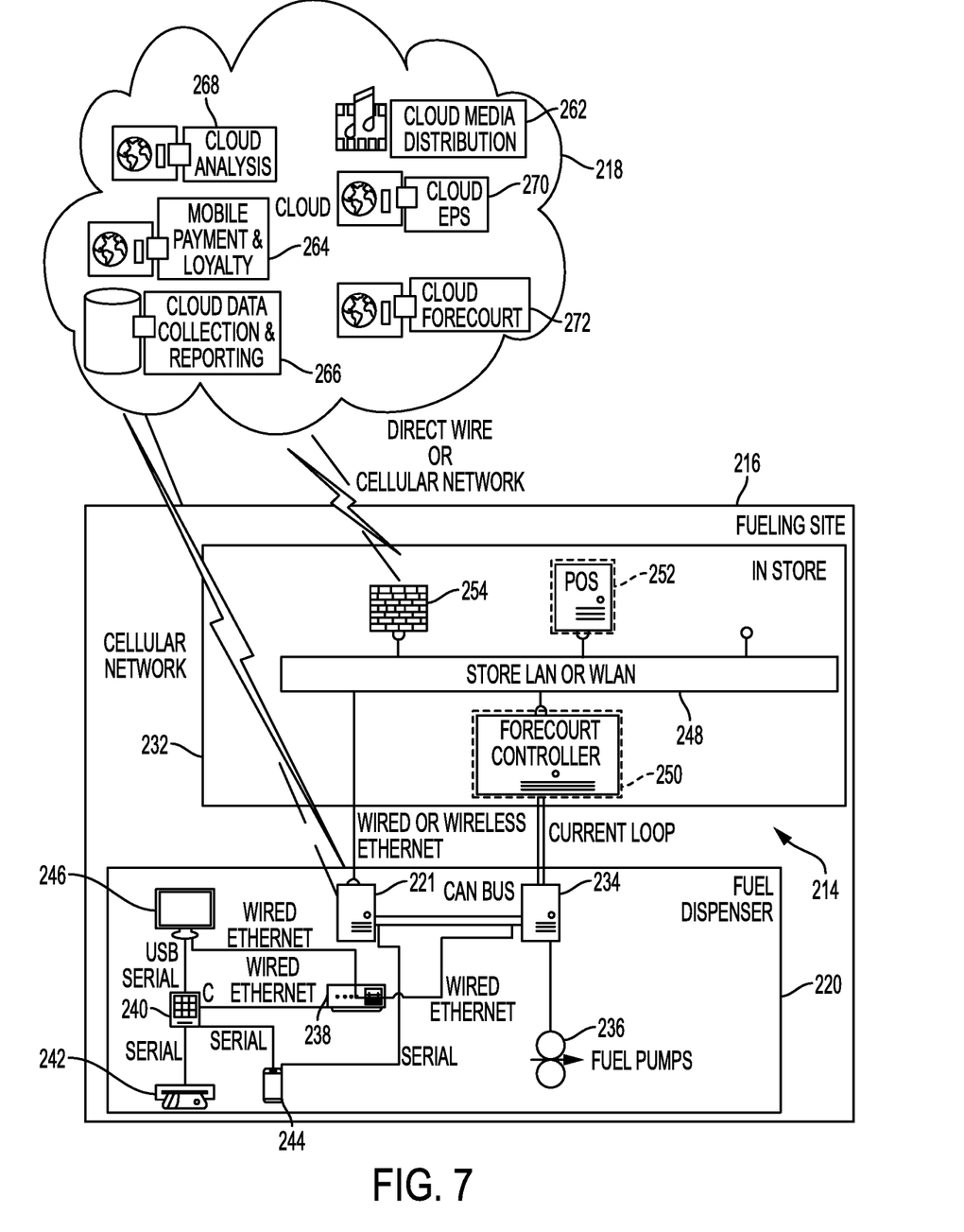
FIG. 7 is a schematic view of one embodiment of a fuel dispensing system and network cloud.
Figure 8:
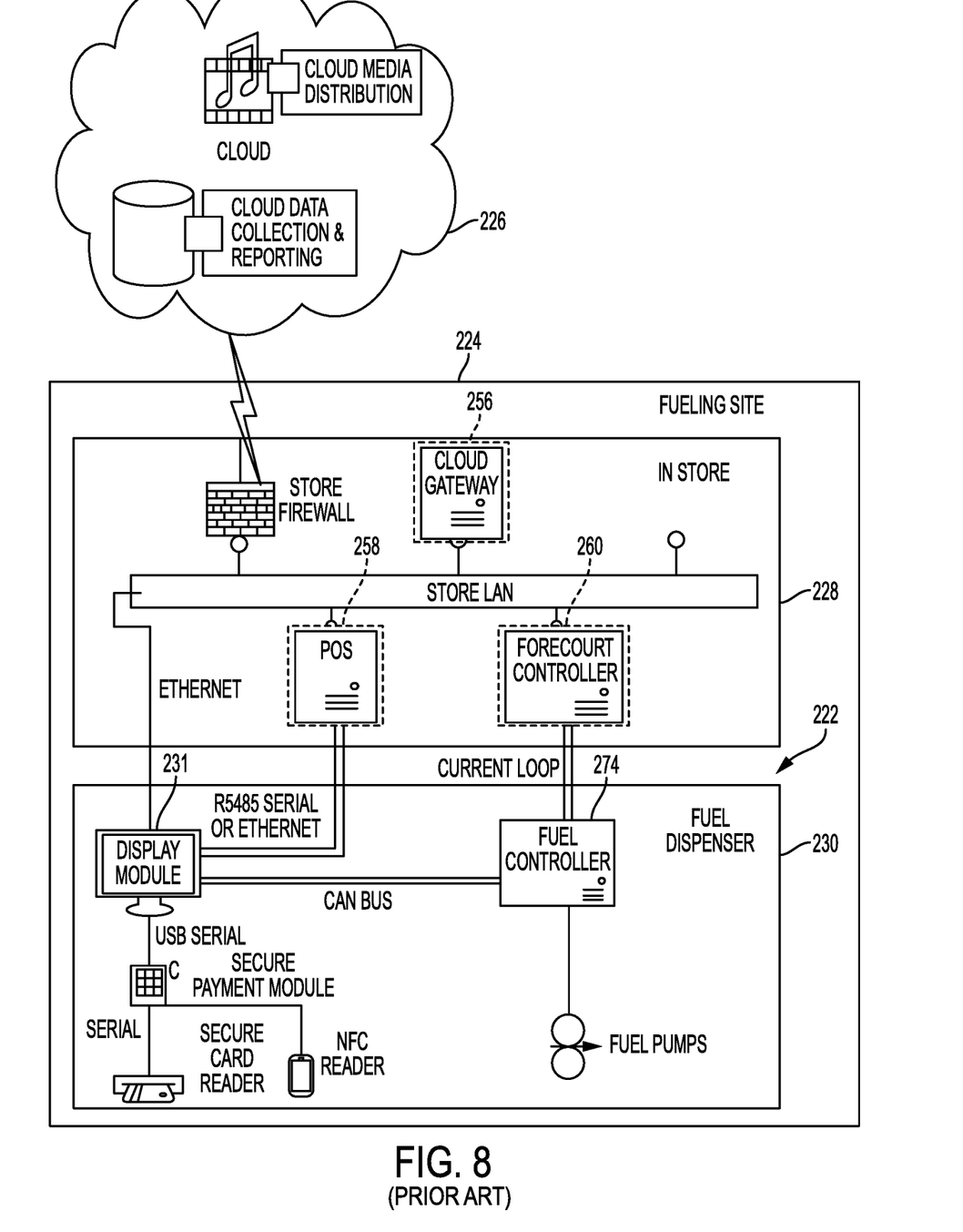
FIG. 8 (Prior Art) is a schematic view of a current fuel dispensing system and network cloud.

FIG. 7 illustrates one embodiment of a fuel dispensing system 214 at a fueling site 216 and network cloud 218 with which one or more fuel dispensers 220 at the site 216 are configured to directly communicate. For ease of illustration and explanation only one fuel dispenser 220 is shown at the site 216, but the site 216 can include a plurality of fuel dispensers, which may each be the same as each other or different from any one or more of the other fuel dispensers at the site 216. In an exemplary embodiment in which a plurality of fuel dispensers are at the site 216, each of the fuel dispensers includes a communication module similar to a communication module 221 of the fuel dispenser 220 such that each of the plurality of fuel dispensers is configured to directly communicate with the cloud 218. Although specific types of wireless communication (e.g., cellular, etc.) and wired communication (e.g., CAN bus, etc.) are shown in FIG. 7, as discussed above, various types of wireless and wired communication can be used. For comparison purposes, FIG. 8 illustrates a current fuel dispensing system 222 at a fueling site 224 and a current network cloud 226 with which a POS system 228 at the site 224 is configured to communicate. For ease of illustration and explanation only one fuel dispenser 230 is shown at the site 224, but the site 224 can include a plurality of fuel dispensers, which may each be the same as each other or different from any one or more of the other fuel dispensers at the site 224.

As shown in FIG. 7, the fuel dispenser 220 includes the communication module 221 configured to communicate directly with the cloud 218 and an in-store system 232; a fuel controller 234 configured to communicate with the communication module 221 and the in-store system 232; one or more fuel pumps 236 configured to communicate with the fuel controller 234; a communication link 238 configured to communicate with the fuel controller 234; a payment module 240 (e.g., a keypad, etc.) configured to communicate with the communication link 238; a card reader 242 configured to communicate with the payment module 240; a near field communication (NFC) reader 244 for mobile terminal communication configured to communicate with the payment module 240 and the communication module 221; and a display 246 configured to communicate with the payment module 240 and the communication link 238. The in-store system 232 includes a local area network 248, a forecourt controller 250, a POS system 252, and a firewall 254 through which communications can occur with the cloud 218. In contrast, the fuel dispenser 230 of the current fuel dispensing system 222 of FIG. 8 lacks a communication module and communication link and cannot communicate directly with the cloud 226. The fuel dispenser 230 must instead communicate indirectly with the cloud 226 through the in-store system 232, e.g., through a POS system 258 and forecourt controller 260 thereof. Also, unlike the in-store system 228 of FIG. 7, the in-store system 232 includes a cloud gateway 256 for communication with the cloud 226.

As shown in FIG. 7, the cloud 218 includes media services 262 accessible to the fuel dispenser 220 via the communication module 221 (e.g., via a media module thereof) that allow visual and/or audible media to be provided by the fuel dispenser 220 on the display 246. In contrast, the fuel dispenser 230 of FIG. 8 cannot directly receive any media from the cloud 226 without the gateway 256 of the in-store system 228 being an intermediary. As mentioned above, in at least some embodiments, the communication module 221 can be configured to function in standalone mode and control provision of media on the display 246 without instruction from the cloud 218.

The cloud 218 also includes mobile payment and loyalty services 264 accessible to the fuel dispenser 220 via the communication module 221 (e.g., via a mobile payment module thereof) that allow for the processing of mobile payment transactions for fuel and/or other goods or services provided at the site 216 that includes the fuel dispenser 220. In contrast, the cloud 226 of FIG. 8 lacks mobile payment and loyalty services, as any mobile payment and loyalty processing is handled at the in-store system 228. The fuel dispenser 220 of FIG. 7, unlike the fuel dispenser 230 of FIG. 8, may thus more efficiently handle mobile payment and loyalty processing and/or more seamlessly provide mobile payment service to a user of the fuel dispenser 220. The mobile payment and loyalty services 264 may allow the fuel dispenser 220 to accept mobile payment via the NFC reader 244 and activate the dispenser 220 to dispense fuel therefrom in response to verified mobile payment, unlike the fuel dispenser 230 of FIG. 8 that must process mobile payment through the in-store system 228 instead of directly with the cloud.

The cloud 218 also includes data collection and reporting services 266 accessible to the fuel dispenser 220 via the communication module 221 (e.g., via a fuel management module thereof) that allow comparison of fuel usage metrics with fuel tank metrics. In contrast, the fuel dispenser 230 of FIG. 8 cannot directly communicate any fuel usage metrics to the cloud 226 without the gateway 256 of the in-store system 228 being an intermediary.

The cloud 218 also includes analysis services 268 accessible to the fuel dispenser 220 via the communication module 221 (e.g., via a monitoring and analytics module thereof) that enable site owners to understand the status of the fuel dispenser 220. In contrast, the cloud 226 of FIG. 8 lacks analysis services, as any analysis to understand the status of a fuel dispenser is handled at the in-store system 228. The fuel dispenser 220 of FIG. 7, unlike the fuel dispenser 230 of FIG. 8, may thus be more efficiently managed and maintained.

The cloud 218 also includes electronic payment services (EPS) 270 accessible to the fuel dispenser 220 via the communication module 221 (e.g., via a payment terminal module thereof) that allow for the processing of outdoor payment transactions for fuel and/or other goods or services provided at the site 216 involving the card reader 242 at the fuel dispenser 220. In contrast, the cloud 226 of FIG. 8 lacks EPS and cannot process outdoor payment transactions without communicating with the in-store system 228 as an intermediary, and payment information shown on a display 231 of the fuel dispenser 230 is controlled by the POS system 258.

The cloud 218 also includes forecourt services 272 accessible to the fuel dispenser 220 (e.g., the fuel controller 234 thereof) via the communication module 221 (e.g., via a forecourt module thereof) that allow for controlling an amount of fuel that is dispensed from the fuel dispenser 220. In contrast, a fuel controller 274 of the fuel dispenser 230 of FIG. 8 communicated with the forecourt controller 260 to control an amount of fuel dispensed from the fuel dispenser 230. Communication lines must thus be provided between the in-store system 260 and the fuel dispenser 230, unlike in the system 214 of FIG. 7 which may accordingly have lower overhead since such communication lines are not needed for the fuel controller 234 and/or may allow a site owner to more easily integrate forecourt controls into their site 216 services.

A fuel dispenser can be configured to use radio frequency identification (RFID) tags to track warranty and maintenance of one or more components of the fuel dispenser. Components within a fuel dispenser may be replaced during the dispenser's lifetime with components that are not correct for the dispenser, e.g., unauthorized parts and/or incompatible parts. Being able to track components within the fuel dispenser may facilitate identification of these improperly replaced parts and may trigger appropriate remedial action, such as notice of voided warranty, notice that the improper part should be replaced with a proper part, etc. It can be difficult to track the warranty on new components within a fuel dispenser that are added to replace an existing part because distributors and authorized service agents do not always return replaced parts in a timely manner. Being able to track components within the fuel dispenser may facilitate identification of the new components within the dispenser and allow for more accurate tracking of the new components' warranties. A fuel dispenser is typically manufactured according to a bill of materials (BOM) that specifies the parts to be included in the fuel dispenser. Being able to track components within the fuel dispenser may help ensure that all parts specified in the BOM are included in the fuel dispenser.

One or more components of the fuel dispenser can have an RFID tag attached thereto configured to facilitate tracking thereof. In an exemplary embodiment, every part of the fuel dispenser can have an RFID tag attached thereto to facilitate complete tracking of the fuel dispenser's components. In other embodiments, only some of the parts of the fuel dispenser can have an attached RFID tag attached thereto, such as only those parts that are added to the fuel dispenser after the fuel dispenser is installed on site (e.g., as parts are replaced in the fuel dispenser, the new parts added to the fuel dispenser include RFID tags), such as only those parts above a certain price point, such as only those parts that most often require warranty invocation, or such as only those parts that are typically replaced at least once during the lifetime of a fuel dispenser.

The RFID tag can have any of a variety of configurations and can include any of a variety of existing RFID tags, as will be appreciated by a person skilled in the art. In general, the RFID tag is configured to be programmable to allow programming of identification information into the tag to facilitate identification of the part to which the RFID tag is attached. The identification information can include, for example, a manufacturer of the part, software version installed on the part, warranty information (e.g., length of warranty time, etc.), and/or a serial number of the part.

The fuel dispenser can include one or more RFID scanners configured to scan the one or more RFID tags attached to one or more parts of the fuel dispenser to gather identification information from the RFID tags. In an exemplary embodiment, the fuel dispenser can include a first RFID scanner in an electronics compartment thereof configured to scan RFID tags on parts within the electronics component and a second RFID scanner in a pump compartment thereof configured to scan RFID tags on parts within the pump component. The electronics compartment and pump compartment are typically isolated from each other and each defined by a metal housing, so having an RFID scanner in each of the two compartments may allow the RFID scanners to read RFID tags without having to scan through metal, e.g., through the housing of the compartment within which it is disposed. The RFID scanners can have any of a variety of configurations and can include any of a variety of existing RFID scanners, as will be appreciated by a person skilled in the art.

The fuel dispenser can include a communication module, as discussed herein, that is configured communicate with the fuel dispenser's one or more RFID scanners. The communication module can be configured to gather from each of the one or more RFID scanners the identification information received by the one or more RFID scanners. The communication module can be configured to communicate with a network cloud, as discussed herein, and communicate the identification information thereto. The network cloud can then analyze the identification information to identify predetermined conditions and/or transmit the identification information to another computer system for such analysis. The predetermined conditions can include any one or more of a new part in the fuel dispenser (e.g., determining that the RFID tag has been scanned for the first time for that fuel dispenser), an unauthorized part being in the fuel dispenser (e.g., determining that a part with an unauthorized manufacturer is in the fuel dispenser, determining that a part with an unrecognized serial number is in the fuel dispenser, etc.), a part having an outdated software version, a part having an expired warranty, and a part being missing from the fuel dispenser (e.g., determining that one or more parts listed on a BOM for the fuel dispenser is not included in the received scan data or determining that a part previously scanned was not scanned in the most recent scan).

The fuel dispenser's one or more RFID scanners can be configured to scan RFID tags on a predetermined schedule, e.g., every 24 hours, every other hour, every week, every month, etc. The fuel dispenser's one or more RFID scanners can be configured to continuously scan so as to immediately detect any new RFID tags and thereby help ensure that the most up-to-date information about the fuel dispenser's parts is received by the cloud.

During manufacturing of a fuel dispenser, the parts installed on the fuel dispenser can be RFID scanned as the dispenser moves from station to station along the manufacturing line on the production floor. If any one or more parts that should have been installed at a previous station is not identified in the scan, it can be concluded that those part(s) are missing from the fuel dispenser and that corrective action should be taken, such as the dispenser being pulled from the line for installation of the missing part(s) and/or an alarm signal being sent to the station where the missing part(s) were identified so a user can determine appropriate action to take. At the end of manufacturing, a complete inventory of all parts can be communicated from the dispenser's communication module to the cloud to establish a baseline for the dispenser, against which subsequent scans may be compared to determine, e.g., replaced parts, expired warranties, etc.

In addition to or instead of the fuel dispenser communicating scan data to the cloud, the communication module can be configured to communicate the scan data to a local computer system. For example, during servicing of the fuel dispenser, an authorized service agent may download the can data from the fuel dispenser via the communication module, such as by a mobile terminal communicating with the fuel dispenser. Thus, the agent may be able to immediately identify any warranty problems with parts of the fuel dispenser and determine whether those parts are currently subject to warrantied service, and/or the agent may be able to determine that parts are replaced with parts appropriate for the dispenser.

In addition to or instead of the fuel dispenser including one or more RFID scanners on-board that scan the one or more RFID tags attached to parts of the fuel dispenser, the one or more RFID tags can be read by an RFID scanner external to the fuel dispenser, e.g., a handheld RFID scanner manipulated by a user. For example, during servicing of the fuel dispenser, an authorized service agent may manually scan the dispenser's RFID tags with an RFID scanner.

The fuel dispenser 146 of FIG. 4 is one embodiment of a fuel dispenser that includes at least one RFID scanner 167, 171. Each of the electronics compartment 148 and the pump compartment 150 have an RFID scanner 167, 171 disposed therein, with its associated RFID scanner 167, 171 being configured to scan RFID tags attached to any of the parts within that compartment. The communication module 160 can, as discussed above, be configured to communicate RFID data to the cloud for analysis.

Figure 9:
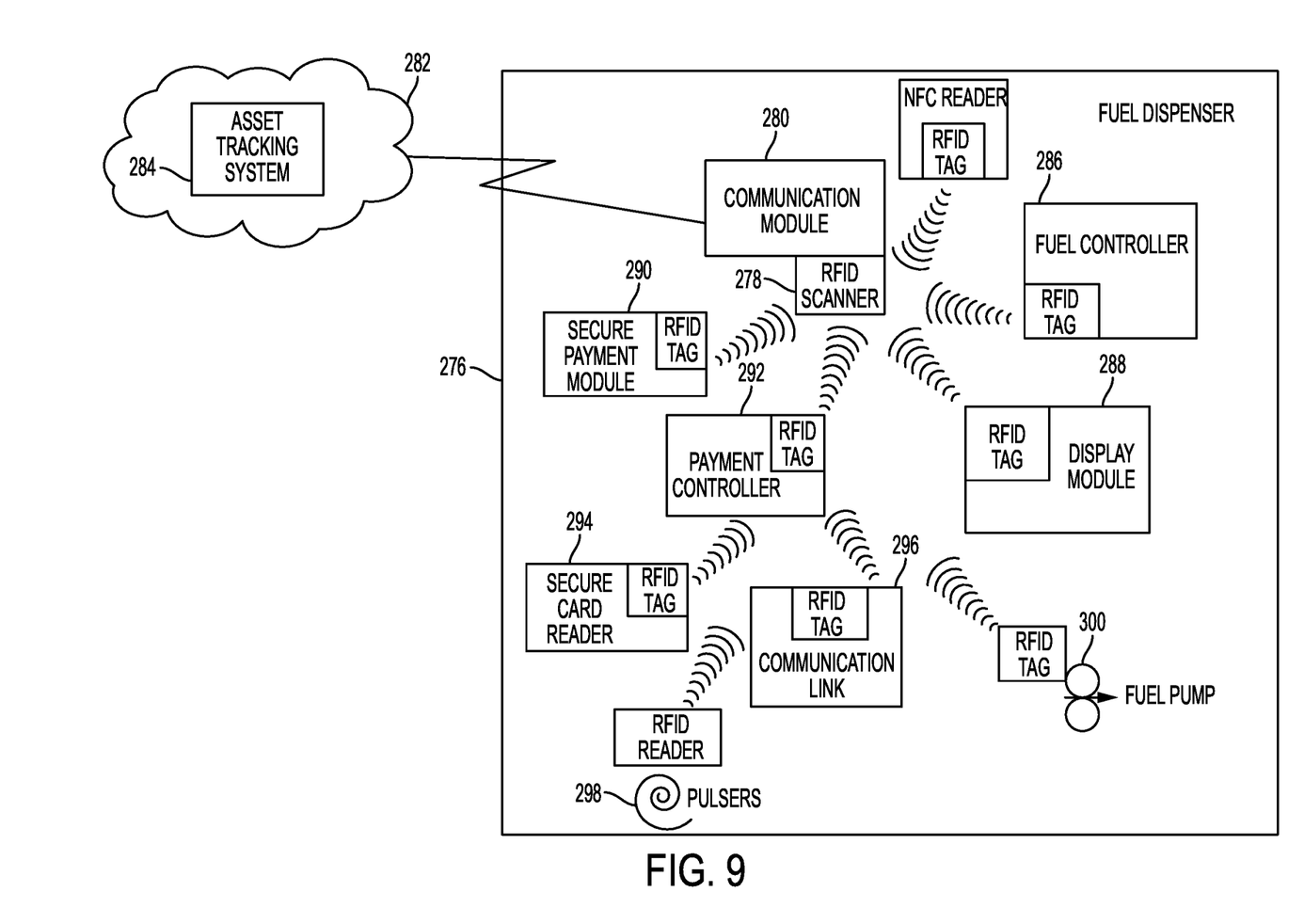
FIG. 9 is a schematic view of another embodiment of a fuel dispensing system and network cloud.

FIG. 9 illustrates one embodiment of a fuel dispenser 276 including an RFID scanner 278 configured to scan RFID tags attached to various parts disposed within the dispenser 276. The RFID scanner 278 is in electronic communication with a communication module 280 of the fuel dispenser 276 that is configured to communicate with a cloud 282, as discussed herein, thereby allowing information indicative of data scanned by the RFID scanner 278 to be communicated from the fuel dispenser 276 to the cloud 282. The cloud 282 includes asset tracking services 284 accessible to the fuel dispenser 276 via the communication module 280 that allow for tracking warranty and maintenance of the components of the fuel dispenser 276 that have RFID tags attached thereto that are scanned by the RFID scanner 278.

The fuel dispenser 276 includes a plurality of components that each have an RFID tag attached thereto and configured to be scanned by the RFID scanner 278. These components include an NFC reader 284, a fuel controller 286, a display 288, a secure payment module 290, a payment controller 292, a secure card reader 294, a communication link 296, pulsers 298, and a fuel pump 300. The pulsers 298 and the fuel pump 300 are in a pump compartment of the dispenser 276, and the NFC reader 284, fuel controller 286, display 288, secure payment module 290, a controller 292, secure card reader 294, and communication link 296 are in an electronics compartment of the dispenser 276. The RFID scanner 278 is thus configured to scan RFID tags in each of the electronics and pump compartments. In other embodiments, the fuel dispenser 276 can have a first RFID scanner in the electronics compartment to scan the components therein that have an RFID tag attached thereto and can have a second RFID scanner in the pump compartment to scan the components therein that have an RFID tag attached thereto.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. A fuel dispenser, comprising:
   a first compartment having therein a pump for dispensing the fuel; and
   a second compartment having therein electronics for facilitating payment for the fuel and for facilitating the dispensing of the fuel, the electronics including a controller configured to control the pump to regulate the dispensing of the fuel, a communication link, a payment system, and a cloud communication module configured to facilitate wireless electronic communication between the fuel dispenser and a network cloud;
   wherein the cloud communication module is configured to transmit metric data to the network cloud, the metric data including at least one of data received by the cloud communication module from the payment system via the communication link and data received by the cloud communication module from the controller via the communication link; and
   wherein the fuel dispenser includes a radio frequency identification (RFID) scanner configured to scan an RFID tag associated with a component disposed in one of the first compartment and the second compartment, and the metric data includes data indicative of information scanned by the RFID scanner.

2. A fuel dispenser, comprising:
   a wired communication link on board the fuel dispenser and configured to facilitate electronic communication between a cloud communication module of the fuel dispenser and a payment system of the fuel dispenser configured to receive customer payment information from a mobile phone to be authorized by a network cloud for payment of fuel;
   a wireless communication link on board the fuel dispenser and configured to facilitate wireless electronic communication directly between the cloud communication module and the network cloud without communicating with an intermediary controller at a fueling site at which the fuel dispenser is located such that the cloud communication module is configured to directly communicate the received customer information to the network cloud without communicating with the intermediary controller; and
   a processor on board the fuel dispenser and configured to cause fuel to be dispensed from the fuel dispenser in response to the customer payment information received via the wired communication link and to data received from the network cloud via the wireless communication link indicative of authorization of the customer payment information;
   wherein the wireless communication link is configured to transmit metric data to the network cloud, the metric data including data received via the wired communication link; and
   wherein the metric data includes scanned data that is indicative of information an RFID scanner on board the fuel dispenser scans from one or more RFID tags attached to one or more components disposed in the fuel dispenser.

3. The fuel dispenser of claim 2, wherein the wired communication link is configured to facilitate electronic communication between the payment system and a controller on board the fuel dispenser and configured to regulate dispensing of fuel from the fuel dispenser; and
   the processor is configured to cause the fuel to be dispensed from the fuel dispenser by causing instructions to be transmitted to the controller via the wired communication link.

4. The fuel dispenser of claim 2, further comprising a display screen configured to display media thereon, the media being displayed having been received from the network cloud.

5. A method of using a fuel dispenser, comprising:
   receiving data at a fuel dispenser from a customer mobile terminal, the received data being indicative of customer payment information to pay for fuel to be dispensed from the fuel dispenser;
   transmitting the data indicative of the customer payment information directly to a network cloud via a wireless communication link on board the fuel dispenser without communicating with an intermediary controller at a fueling site at which the fuel dispenser is located;
   receiving data at the fuel dispenser directly from the network cloud via the wireless communication link without communicating with an intermediary controller at a fueling site at which the fuel dispenser is located, the data received from the network cloud being indicative of the customer payment information having been authorized;
   causing the fuel to be dispensed from the fuel dispenser in response to the receipt of the data indicative of the customer payment information having been authorized; and
   transmitting metric data from the fuel dispenser to the network cloud via the wireless communication link, the metric data including scanned data that is indicative of information an RFID scanner on board the fuel dispenser scans from one or more RFID tags attached to one or more components disposed in the fuel dispenser.

6. The method of claim 5, further comprising receiving media data at the fuel dispenser from the network cloud via the wireless communication link; and
   displaying media on a display screen of the fuel dispenser in accordance with the received media data.

* * * * *